United States Patent [19]
Musil

[11] Patent Number: 4,779,185
[45] Date of Patent: Oct. 18, 1988

[54] CONSTANT VOLTAGE SUPPLY SYSTEM INCLUDING A CONSTANT CURRENT SOURCE DRIVEN SWITCHING REGULATOR

[75] Inventor: Gerhard Musil, Munich, Fed. Rep. of Germany

[73] Assignee: Siemens Aktiengesellschaft, Berlin and Munich, Fed. Rep. of Germany

[21] Appl. No.: 38,405

[22] Filed: Apr. 10, 1987

Related U.S. Application Data

[63] Continuation of Ser. No. 546,122, Oct. 27, 1983.

[30] Foreign Application Priority Data

Nov. 12, 1982 [DE] Fed. Rep. of Germany ....... 3242023

[51] Int. Cl.⁴ .............................................. H02M 7/00
[52] U.S. Cl. ..................................... 363/73; 323/222; 323/282
[58] Field of Search ........................... 307/31, 36, 82; 323/222, 223, 282, 283; 363/15, 16, 17, 21, 25, 73

[56] References Cited

U.S. PATENT DOCUMENTS

| | | | |
|---|---|---|---|
| 3,302,092 | 1/1967 | Bloom et al. | 323/223 |
| 3,523,239 | 8/1970 | Heard | 323/222 |
| 3,571,697 | 3/1971 | Phillips | 323/222 |
| 3,737,755 | 6/1973 | Calkins et al. | 363/17 |
| 3,818,306 | 6/1974 | Marini | 363/15 |
| 3,821,630 | 6/1974 | Kornrumpf et al. | 363/57 |
| 3,930,193 | 12/1975 | Kornrumpf et al. | 363/37 |
| 4,091,434 | 5/1978 | Suzuki et al. | 363/15 |
| 4,160,288 | 7/1979 | Stuart et al. | 363/21 |
| 4,245,285 | 1/1981 | Weiss | 323/222 |
| 4,264,949 | 4/1981 | Simmons et al. | 363/17 |
| 4,293,904 | 10/1981 | Brooks et al. | 363/136 |
| 4,413,224 | 11/1983 | Krupka et al. | 323/222 |

FOREIGN PATENT DOCUMENTS

| | | |
|---|---|---|
| 2485288 | 12/1981 | France . |
| 1254202 | 11/1967 | Fed. Rep. of Germany . |
| 1947901 | 10/1977 | Fed. Rep. of Germany . |
| 1251114 | 10/1971 | United Kingdom . |

OTHER PUBLICATIONS

Siemens-Zeitschrift 48 (1974), Supplement "Machrichten-Ubertragungstechnik" pp. 127 to 130.
Electronic Practice (ELEKTRONIKPRAXIS), vol. 10, No. 6, Jun. 1975, pp. 16, 18, 20.
Theorie und Schaltungstechnik, 312 Elektrotechnik, May 1978, vol. 60, No. 9, by Christ et al.

*Primary Examiner*—Patrick R. Salce
*Assistant Examiner*—Jeffrey Starratt
*Attorney, Agent, or Firm*—Adel A. Ahmed

[57] ABSTRACT

The invention relates to a circuit arrangement for supplying a DC voltage to be maintained constant to electric loads, at least one load being connected via a switching regulator to a supply loop fed with an impressed current. The circuit maintains its regulation even if the loads fluctuate greatly within a short time. Accordingly, the invention provides, that at the switching regulator the switching element is arranged parallel to the input; that between the switching element and a capacitor lying parallel to the output of the switching regulator a diode is arranged which is cut off when the switching element is conducting. The circuit arrangement can be used to advantage in power supply equipments of electric communications systems.

8 Claims, 2 Drawing Sheets

CONSTANT VOLTAGE SUPPLY SYSTEM INCLUDING A CONSTANT CURRENT SOURCE DRIVEN SWITCHING REGULATOR

CROSS-REFERENCE TO RELATED APPLICATION

This is a continuation of Ser. No. 546,122 filed Oct. 27, 1983.

BACKGROUND OF THE INVENTION

The invention relates to a circuit arrangement for supplying a constant voltage to electric loads, where at least one load is connected via a switching regulator to a power feed loop fed with a constant current. The switching regulator comprises a switching element controllable by means of a control circuit as a function of a voltage which is to be maintained.

Such a circuit arrangement is known from, for example, German patent DE-AS No. 1,947,901.

The known circuit arrangement is intended in particular for a constant load. In normal operation the output voltage is maintained constant by means of a series regulator. The switching regulator is active only below a given load current, or in particular, in the case of a load removal.

For electrical systems with interlinked loads it is often advantageous to supply the loads with constant current over a common line. Such power supply arrangements are frequently used in long-distance traffic equipment. The individual line amplifiers or regenerators are connected in series and are powered from one or two feeding terminal stations. Since in normal operation they behave as an almost constant ohmic load, a certain, largely constant voltage will occur in the system as a whole.

Most electronic devices can best be operated with constant voltage. However, they then have a correlated current consumption, which is load-dependent. To permit current feed, the feed device must be rated so that the desired operating voltage occurs at the current then given. If it is rated for a smaller current the excess current is removed via a zener diode connected in parallel.

The rating of the loads presents a problem in particular when they are subjected to large variations as when it is necessary to operate equipment having different power requirements, and/or when several equipments are to be connected in parallel in different arrangements. In such cases it is desirable to interject in front of the actual loads converters which produce a constant voltage from a constant current and which then, in accordance with current consumption operate with different input voltages.

An arrangement which in a lower range of output power operates with a switching regulator is described in German patent document DE-AS No. 1,947,901. In the known arrangement it is assumed that at large load variations neither the swtiching regulator principle nor the series pass regulator principle by itself is usable without considerable disadvantages. The arrangement, therefore, is such that the regulation process adjusts itself to the more favorable control principle or respectively to a combination of the two regulation principles depending on the operational case at hand. With a view to desired dynamic properties, the operating point in rated duty lies in the control range of the series pass regulator. For relatively large control ranges, however, this may lead to an unacceptably high power dissipation.

From Siemens-Zeitschrift 48 (1974), Supplement "Nachrichten-Übertragungstechnik", page 130, there is known further a power supply system in which the transfer factor of transformers of an auto-converter can be adjusted so that the voltage drop at the load resistance has a given value. Here the auto-converter is adjustable to a current transfer corresponding to the particular use. For regulating voltage a voltage regulator of the series pass type is used.

The current transfer can be adjusted to the optimum value automatically in steps with the aid of a switching device. However, this involves additional expense.

The generally accepted converter principles are based on the assumption that converters are operated with at least approximately constant voltage. Generally, they have several disadvantages when they are operated with a load-independent input current and are required to deliver a constant voltage for a varying load.

Upon being switched on, the converters begin to operate at a voltage which must be lower than the lowest input voltage to be expected in the steady state. Without additional measures, the usual converters try to produce the nominal voltages directly at the output, the internal tank and filter capacitors being charged additionally. Consequently, the current drain is especially high during the initial turn on. But if the developed current is limited, as is the case with a constant current source, the voltage will collapse at the output. In such cases, the converters cannot be switched on.

Also at greatly fluctuating loads it may occur that the voltage collapses at the input because of the current limitation. This can be avoided only through additional measures, e.g. by over designing the converters as referred to the nominal power.

The two cases described can be mastered according to German patent document DE-AS No. 1,947,901 by a control circuit which, however, is relatively expensive and moreover has the property that rapid load fluctuations are intercepted by a series pass regulator and the mode of operation is changed relatively slowly in such a way that the converter is operated with the then correspondingly adapted voltage at the input.

SUMMARY OF THE INVENTION

It is an object of the present invention to provide a power supply circuit arrangement for electric loads which provides to the actual load or respectively to several loads at its output or outputs one or more constant voltages, in such a way that combined with simple construction it permits the current drain of these loads to vary greatly within a short time. In particular, even at very great load fluctuations a high efficiency combined with simple construction is to be achieved and thus a high safety of operation is to be ensured.

Accordingly, the invention features in one embodiment an improved power supply circuit as follows. In a circuit arrangement for supplying a constant voltage to electric loads where at least one load is connected via a switching regulator to a supply loop fed with an impressed current and where the switching regulator comprises a switching element controllable by means of a control circuit as a function of a DC voltage which is to be maintained constant, the improvement resides in that: the switching element is arranged parallel to the input of the switching regulator; a capacitor is also included; and a diode is present and is oriented such that when the switching element is conducting the diode is cut off. The diode is arranged between the switching element and the capacitor and the capacitor itself is connected parallel to the output of the switching regulator.

Through this arrangement one obtains the advantage, that through rapid adaptation of the power drawn at the input to the respective loads, a high efficiency over the entire operating range results. Hence, low power dissipation up to and including a no load operation on the output side is also realized. The input-side adaptation of the power also permits varying the impressed power supply current if necessary, so as to better adapt the section to certain operating conditions.

In another embodiment of the invention, a choke is arranged between the input of the switching regulator and the switching element in at least one series arm, while a capacitor is provided in a shunt arm lying on the side of the choke away from the switching element. With this the voltage swings at the input of the switching regulator can be substantially reduced, so that a relatively large number of loads can be connected to one end of the same current source without adversely effecting the low-pass behavior of the power supply line on the operation of the switching regulators.

The switching element can be controlled with control pulses of constant or of variable frequency. For control with variable frequency, control pulses of constant duration may be used.

Especially advantageous is a design of a circuit arrangement in which the switching element is controllable by clock pulses duration-modulated with the aid of the control circuit.

In addition, between the output of the switching regulator and at least one load a voltage converter may be arranged, with the possibility of connecting several voltage converters to a common switching regulator.

A relatively stable and constant loop voltage can be obtained in advantageous manner at low expense if the voltage converter is simply an uncontrolled flow converter with an isolating transformer, in particular one with a fixed preadjustable duty cycle. With the aid of stepwise duty cycle adjustment, the voltage converter can then easily be adjusted to different load powers.

The voltage converter may have its own clock pulse supply. In connection with a clock-controlled switching regulator, control of the switching regulator and of the voltage converter by a common clock pulse generator will result in an especially simple and inexpensive design.

The monitoring point for the control circuit of the switching regulator may be the load voltage itself or another voltage which is suitable to serve as a measure of the load voltage. It may then be especially advantageous to use as the monitoring terminal the output voltage of the switching regulator itself.

The capacitance of the capacitor connected at the input of the switching regulator is preferably rated smaller by at least a factor of 10 than the capacitance of the capacitor connected at the output of the switching regulator.

The regulator may be a component intended for converters, the switching element being driven by the component in a complementary manner referred to converter uses. Thus commercial integrated circuits can advantageously be used, simple measures being sufficient to adapt the circuit to whatever is different from the standard usage.

A control of the switching element in such a way that the switching element is controllable by control pulses of variable repetition rate formed with the aid of the control circuit may take place in addition to or instead of control with duration-modulated pulses.

Other features and advantages of the invention will be apparent from the following description of the preferred embodiments, and from the claims.

For a full understanding of the present invention, reference should now be made to the following detailed description of the preferred embodiments of the invention and to the accompanying drawings.

BRIEF DESCRIPTION OF THE DRAWINGS

FIG. 3 shows further details of a switching regulator according to FIG. 2.

DETAILED DESCRIPTION

Figure 1:
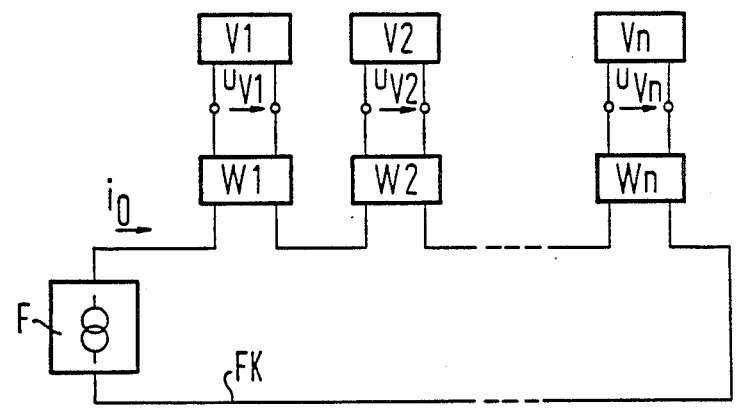
FIG. 1 shows a power supply device wherein each of the loads is preceded by a switching regulator.

In FIG. 1 is shown a power supply installation in a block diagram. The power supply unit F delivers a constant direct current $i_o$. The loads V1, V2, ... Vn require, for their optimum operation, a constant voltage input. The switching regulators W1, W2, ... Wn connected to the input of the loads transform the current $i_o$ impressed at their respective inputs into a constant voltage $U_{V1}$, $U_{V2}$, ... $U_{Vn}$ for the load.

Figure 2:
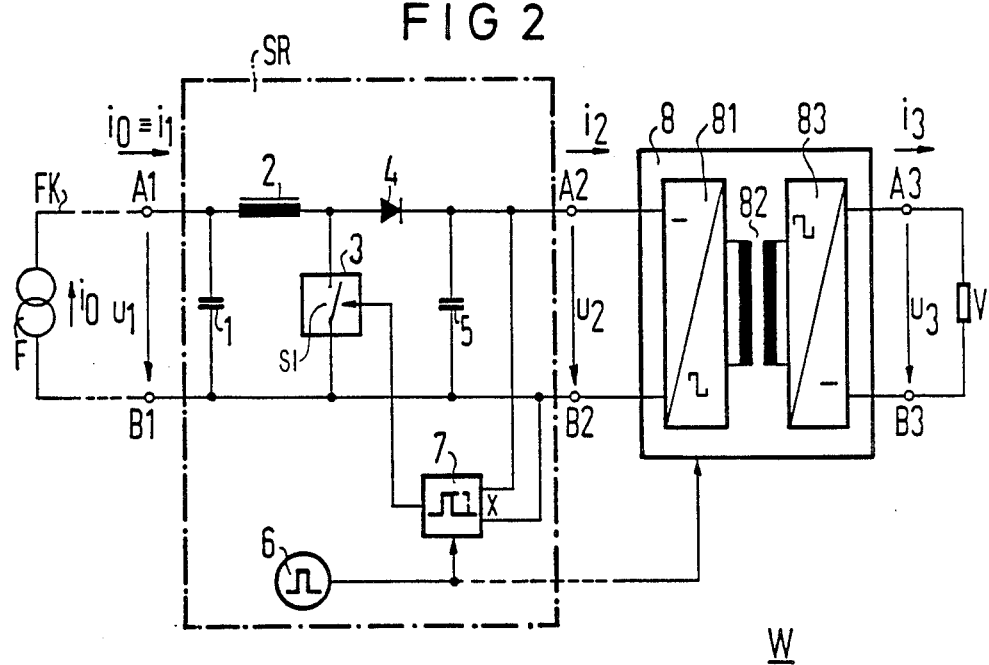
FIG. 2 shows a switching regulator which transforms an impressed direct current into a constant voltage.

FIG. 2 shows a portion of the power supply illustrated in FIG. 1, the construction of the switching regulator being shown in greater detail.

At the switching regulator SR, the capacitor 1 is arranged parallel to the input, while the capacitor 5 is arranged parallel to the output. The capacitors 1 and 5 and the switching element 3 are in single pole connection with one another. On the side away from this junction, the capacitors 1 and 5 are connected via a series connection of the choke 2 and the diode 4, choke 2 being applied at the input, and diode 4 being oriented so that it is conducting from the input to the output. The switching element 3 is arranged in a shunt arm of the switching regulator between the junction of choke 2 and diode 4 on the one hand and the junction of capacitors 1 and 5, on the other.

The switching regulator SR forms the actual current-voltage conversion. It consists of the choke 2 and the semiconductor switch 3, which are connected in series with each other directly in the power-fed line section: Arranged parallel thereto is the capacitor 1, which is small by comparison with the capacitor 5 at the output of the switching regulator.

The semiconductor switch 3 is opened and closed by a pulse-width (or duration) modulated signal in such a way that just enough of the energy stored in choke 2 and in the input capacitor 1 is supplied via diode 4 to the output capacitor 5 for the voltage at the output capacitor to remain constant as long as a certain load current, which at this point is practically equal to the power current $i_o$, is not exceeded. The control of the pulse-width modulated signal occurs in the same manner as in known choke transformers.

Because of the constant voltage at its input, the constant voltage converter 8 connected after the switching regulator can be designed in a simple manner according to one of the known principles. It is preferably an uncontrolled flow converter with isolating transformer. Its clock frequency is advantageously derived from the same oscillator 6 which also actuates the switching regulator.

The device can follow rapid load fluctuations, as the input capacitor is relatively small and therefore is reloaded quickly to the new input voltage corresponding to the changed load. The voltage converter, being by comparison inherently sluggish, is not affected by the change in its mode of operation.

The power supply unit F supplies the constant current $i_o$. The device to be powered, represented as load resistance V, is to be connected at the terminals A3 and B3. Between the terminals A1, B1, and A3, B3 is the preconnected device W, hereinafter referred to as a constant current/constant voltage converter. Since it consists of virtually lossless elements, its efficiency is high. Therefore, to simplify the following description, the device is regarded as totally non-dissipating.

The switching regulator SR between the terminals A1, B1 and A2, B2 converts the constant current $i_1$ into a constant voltage $U_2$. The constant voltage converter 8 converts this voltage $U_2$ into the desired voltage $U_3$. The voltage converter 8 also yields a generally desirable potential isolation.

If the connected load V is operated at its nominal voltage $u_3$, it draws the current $i_3$. In lossfree operation the absorbed power $u_1 \times i_1$ equals the delivered power $u_3 \times i_3$. But since for a current input supply the current $i_1$ is equal to the output current $i_o$ of the power-feed unit F, there is required at the input A1, B1 the voltage $$u_1 = \frac{i_3 u_3}{i_o} \quad (1)$$

The feed unit consisting of the switching regulator SR and the voltage converter 8 is rated for that current $i_{3max}$ which the load V absorbs as a maximum in undisturbed operation; here very short load peaks may be disregarded, as they are taken care of by the energy storage devices, in particular the capacitors, which for reasons of circuitry are always available anyway.

Because of equation (1) there supplies also $$u_{1max} = \frac{i_{3max} u_3}{i_o} \quad (2)$$

Expediently the switching regulator SR is such that there occurs at the terminals A2, B2 a voltage $$u_2 \geqq u_{1max} \quad (3)$$

In particular, the mean value of the voltage $u_2$ is arranged to be slightly higher than the voltage $u_{1max}$ so that, at this limit of the control range, the switching regulator just barely still operates in the switching mode.

The voltage converter 8 must now merely convert a constant voltage $u_2$ into the likewise constant voltage $u_3$. For this, constant voltage converters according to all known principles are suitable.

To produce from the constant current $i_o$ a constant voltage $u_2$ it suffices to charge the capacitor 5 via the diode 4 and, when the voltage $u_2$ is reached, to actuate switch 3 via the regulator 7 in such a way that through intermittent recharging the voltage $u_2$ remains within preset narrow limits. This can be done e.g. in that the switch is actuated by a pulse train which is delivered by the oscillator 6 and whose pulses are controlled as to width by a regulator 7. This method, of course, leads to voltage jumps at the input A1, B1, the voltage $u_1$ jumping between the values $u_1=0$ and $u_1=u_2$.

The capacitor 1 and choke 2 make it possible to supply power to several devices V1–Vn as is shown in FIG. 1 without adversely effecting the low-pass nature of the power supply line. At the same time, impermissible interferences of higher frequency are reliably avoided.

Expediently the frequency of the oscillator is high enough, in particular about 30 kHz, to minimize the voltage fluctuations at capacitor 5 caused by the periodical recharging.

This is readily possible in advantageous manner since impermissible interferences of higher frequency are avoided by capacitor 1 and choke 2. The capacitance of capacitor 1 in particular is rated high enough so that it is independent of tolerances of the section capacitance and that the switching gaps of switch 3 are bridged. On the other hand, the capacitor 1 is small enough for it to be charged by the current $i_o$ which ranges from a minimum voltage $u_{1min}$ to a maximum voltage $u_{1max}$ in a sufficiently short time. Choke 2 maintains the current flow during the switching gaps. Choke 2 and capacitor 1 may be regarded as a filter section which absorbs voltage surges occurring at switch 3.

As to form, the switching regulator SR resembles the known step-up cutoff converter where via an intermittently charged storage choke a lower voltage is transformed into a higher one. However, referring to the regulator, as such a step-up converter, regulator 7 operates precisely in the opposite sense. If only small currents $i_3$ and hence $i_2$ are needed, switch 3 remains closed during the greater part of the switching period, i.e. the duty cycle is long, and there results, as desired a low input voltage $u_1$. With the step-up cutoff converter, which is fed with a constant voltage, the switch is in this case, on the contrary, closed only briefly.

For greater currents $i_3$ the duty cycle of switch 3 becomes increasingly shorter, until at the current $i_3=i_{3max}$ switch 3 can remain open the whole time. Then the current $i_{2max}=i_o$ flows directly via choke 2 and diode 4 into the capacitor 5, where it is immediately discharged again.

When switching on, switch S1 is at first open. And without further measure it remains so until the voltage $u_2$ has reached its desired value $u_{1max}$. Then the regulator 7 goes into action and the voltage $u_1$ drops very rapidly in accordance with the load. What is advantageous here is that the capacitor 5 serving as energy accumulator and the then following accumulators can be charged with maximum current without any further measures. Choke 2 and capacitor 1 are to make available reliably only the energy required for the switching gaps.

If there is a sudden removal of load, the energy is given off by capacitor 1, which is then charged too high, to capacitor 5. With that, the voltage $u_2$ increases and in the extreme case the regulator 7 sets switch 3 on continuously for some time. Capacitor 5 discharges relatively quickly via the new load to the nominal value of voltage $u_2$ since no load is resupplied until this voltage is reached and regulator 7 again actuates the switch.

A suddenly increasing current consumption also leads to a blocking of the switch, which now remains continuously open. The input voltage $u_1$ increases rapidly and capacitor 5 is recharged with maximum current until a new stable state adjusts itself.

An overload leading to a short circuit at the output, which for ideal performance of the voltage converter 8 also acts as an overload at the terminals A2, B2 leads to a continuous dropping of voltage $u_2$ to voltage $u_2'$ to below the nominal value thereof. Switch 3 remains continuously open, and capacitor 5 is recharged directly. In this case, which is a fault case, $u_1'$ then equals $u_2'$. Since both the choke 2 and the diode 4 must be rated for the current $i_o$, overload of the structural elements does not occur.

After elimination of the fault, the voltage $u_2$ increases with a minimum of delay, as during turn on.

For the operation of the device as a whole, the constant voltage converter 8 is necessary only if isolation is required. If no isolation is required, e.g. as occurs frequently in wire-bound long-distance traffic systems, and if the power supply current can be rated according to that device having maximum current consumption, then only the switching regulator SR is needed. But also in this case the constant voltage converter 8 offers, at little extra cost and good efficiency, extensive independence in the dimensioning (rating) of the device.

Another advantage is that the system as a whole no longer needs to be rated in consideration of a most unfavorable summation of extreme load cases, but only so as to take into account the most unfavorable actually occurring case, since the switching regulators always draw only the power just then needed.

With the use of a constant voltage converter 8, $i_o$ and $u_3$ are—even without voltage isolation—two quantities selectable entirely independently of each other, linked only through equation (2). Thus it is even possible to operate standard supply systems at a higher than the original current $i_o$ in order to get to lower power supply voltages, e.g. in the cases of long sections. The power supply system adapts itself automatically.

The constant voltage converter 8 operates at constant input voltage $u_2$. It is preferably designed as a flow converter and need not be controlled. If it is operated with a constant duty cycle, it does not require any static current limitation either, as the impressing of the current at the input ensures this function by itself. Dynamic current limitation against current peaks in case of a fault may nevertheless be worthwhile.

Also it is possible to control the regulator 7 by means of the voltage $u_3$ instead of by the voltage $u_2$. However, the overall arrangement is more difficult to realize in terms of controls, and special measures may then be necessary for static overload limitation.

It is, of course, desirable to make the duty cycle adjustable for different loads, in particular so as to make possible a uniform design of the switching regulator SR.

For regulator 7 one uses expediently the same integrated circuits that are suitable also for converters. Switch 3 is operated in a complimentary manner in comparison therewith. For this purpose, inversion of the control signal, the use of an inverse output of the control circuit, or the use of a switching element of the complimentary type or the like may be appropriate.

With the clock pulse generator 6 present in such a regulator 7 for generating the switching frequency the constant voltage converter 8 can be also actuated. This makes the overall circuit smaller.

The regulator 7 and the clock pulse generator 6 may be supplied from an auxiliary voltage source. Appropriately they are operated at the voltage $u_2$ or a voltage derived therefrom. It does not matter then if only a low voltage $u_1$ occurs at the input. However, it must be assured in this case that on switching on, when also the voltage $u_2$ is at first still low, the switch S1 remains open until the supply voltage of the circuit which actuates switch 3 reaches a sufficiently high value to ensure satisfactory functioning of regulator 7 and clock generator 6. If necessary, an auxiliary circuit is provided which keeps switch 3 open until the required voltage supply is ensured. An advantageous solution consists in wiring the switching element in such a way that without further measures it is in the blocked state, and arranging by means of an additional circuit that the control circuit is enabled to make switch 3 conduct only at sufficiently high supply voltages. The first named circuit consists, for example, of a power MOS transistor as switching element and a resistor inserted between gate and source. The second circuit may be in particular a Schmitt trigger preceding the supply input of the driving circuit and delivering in one state the voltage O and in the other state a sufficient supply voltage.

FIG. 3 shows a constant current/constant voltage converter without voltage isolation and hence corresponds to the switching regulator SR from FIG. 2. As control circuit there is used an integrated circuit SG3524J (Texas Instruments). The rating indicated in the figure is for a voltage at the sink $U2 = 50$ V; the maximum current may be $i2 = 180$ mA. At the input a current $i_o = i_1 = 200$ mA is impressed. At 180 mA the input voltage is $U1 = 50$ V, at no load there occurs at the input a voltage $u_1 = 5$ V.

The capacitance of capacitor 1 is 6.8 uF, the capacitance of capacitor 5 is, 500 uF. Choke 2 has an inductance of the order of 3 mH.

The oscillator and the pulse-width modulated regulator are realized by an integrated circuit SG3524J with appropriate interconnections. The oscillator frequency is 33 kHz. The variable gain amplifier (pins 1, 2, 9) is wired so that the arrangement as a whole is stable even under strong load fluctuations, with the possibility of operating several such devices on the input side in series in a common power supply loop without causing oscillations in the system as a whole.

The control circuit also has the necessary reference voltage. Its operating voltage is derived from the output A2-B2, which is especially well suited to this end because of its constant value. The parallel-connected output stage transistors of the integrated circuit drive a CMOS hex inverter of the type 4049, which in turn drives the SIPMOS transistor BSS93. This transistor is the switch marked 3 in FIG. 2.

Sudden load fluctuations are regulated completely within about 80 ms, the mentioned blocking of switch 3 occurring after less than 20 ms. The remaining time is then determined by the time constant of capacitor 5 and load resistance V.

The circuit is short circuit proof and can be switched on with any desired load resistance.

There has thus been shown and described a novel circuit for a power supply which fulfills all the object and advantages sought therefor. Many changes, modifications, variations and other uses and applications of the subject invention will, however, become apparent to those skilled in the art after considering this specification and the accompanying drawings which disclose preferred embodiment thereof. All such changes, modifications, variations and other uses and applications which do not depart from the spirit and scope of the invention are deemed to be covered by the invention which is limited only by the claims which follow.

What is claimed is:

1. Circuit arrangement for providing a DC voltage supply to at least a power utilizing means by way of respective power supply means, said power supply means having an input coupled in a supply loop carrying an impressed current, said respective power supply means including a switching regulator having a controllable switching element and being coupled in parallel to said input of said power supply means by way of a series inductance and a first capacitance in parallel, said controllable switching element having coupled in parallel therewith a series circuit of a diode, said diode being non-conductive when said controllable switching element is conductive, and a second capacitance having a DC voltage converter coupled thereacross, said controllable switching element being controllable by way of a control circuit depending upon a DC voltage to be maintained at least substantially constant across at least one of said second capacitance and an output of said DC voltage converter such that within a regulating range of said switching regulator, relative duration of ON time becomes increasingly smaller for increasingly greater output current, said first capacitance being at least ten (10) times smaller than said second capacitance.

2. Circuit arrangement according to claim 1, wherein said switching regulator and said DC voltage converter are controllable by a common clock oscillator.

3. Circuit arrangement according to claim 1, wherein said DC voltage converter comprises an unregulated flow converter including isolation transformer means and having constant duty cycle.

4. Circuit arrangement according to claim 3, wherein said switching regulator and said DC voltage converter are controllable by a common clock oscillator.

5. Circuit arrangement according to claim 1, wherein said switching element is controllable by a pulse signal modulated by said control circuit.

6. Circuit arrangement according to claim 5, wherein said switching regulator and said DC voltage converter are controllable by a common clock oscillator.

7. Circuit arrangement according to claim 5, wherein said switching element is controllable by clock pulses duration-modulated with the aid of said control circuit.

8. Circuit arrangement according to claim 7, wherein said switching regulator and said DC voltage converter are controllable by a common clock oscillator.

* * * * *